Nov. 25, 1958     A. M. PETERSON     2,861,380

FISHING LURE

Filed Nov. 18, 1957

*INVENTOR.*
ALDON M. PETERSON
BY H. F. Woodward

United States Patent Office 2,861,380
Patented Nov. 25, 1958

2,861,380

FISHING LURE

Aldon M. Peterson, Wayzata, Minn.

Application November 18, 1957, Serial No. 697,265

4 Claims. (Cl. 43—42.22)

This invention relates to the art of catching fish by means of hook and line, the invention having reference more particularly to an artificial lure.

An object of the invention is to provide a ring supporting a hook or hooks detachably secured to a lure body. This novel arrangement of parts makes it possible to place a large number of bait bodies of different shapes and color in a bait box or the like in close proximity to each other without having the hook elements becoming entangled.

A further object of the invention is the provision of novel means for releasably securing hooks to bait bodies.

The above and further objects of the invention will become apparent from the following specification, appended claims and drawings.

Figure 1:
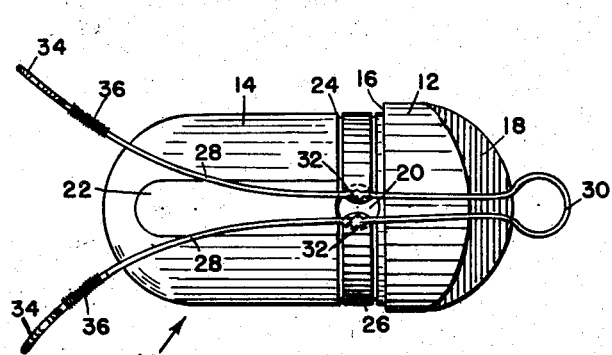
Figure 1 is a bottom plan view of the bait body with hook supporting spring ring in place.
Figure 3:
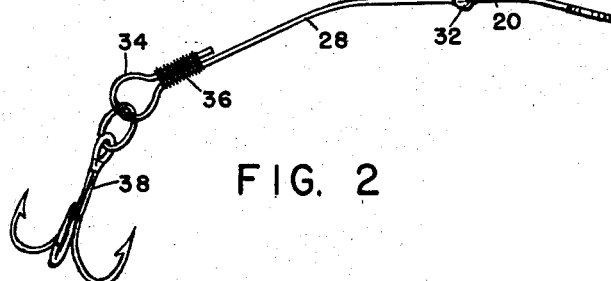
Figure 3 is a side elevational view with parts broken away of the hook supporting ring removed.
Figure 2:
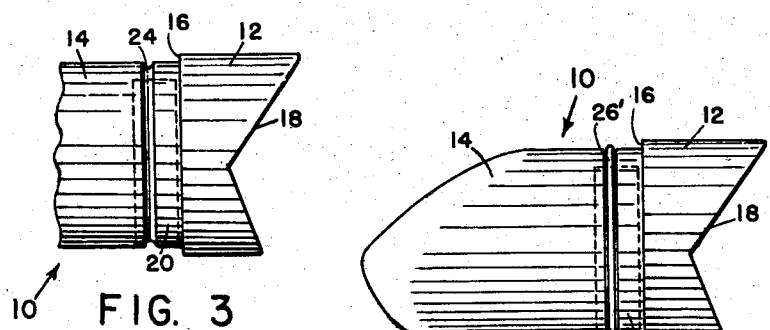
Figure 2 is a side elevational view of the same with a modified hook supporting spring ring.

This invention is an improvement over fishing lures shown in Patent No. 2,686,381 of August 17, 1954, and Patent No. 2,736,123 of February 28, 1956.

Referring to the drawings by reference characters, 10 designates the lure composed of head portion 12 and body portion 14. Between the head portion and body portion is shoulder 16. The forward edge or face 18 is substantially V shaped with the upper part of the V shape of greater length than the lower part.

Adjacent the shoulder 16 in the body portion 14 there is provided a weight receiving opening 20. An annular groove of substantially the shape of the spring ring to fit therein extends around the body portion. The groove intersects and communicates with the weight receiving opening 20. The body portion 14 has a substantially flat surface 22 extending from the opening 20 toward the rear of the body as shown in Figure 1 to assist in the easy separation of the lure and spring ring 26 or 26'.

The spring ring 26 or 26' when in position in the groove 24 has the top surface thereof substantially flush with the outer surface of the body 14. To enable the split spring ring 26 or 26' to be quickly and easily removed a member 28 is suitably attached at 32 to the ring. The split ring 26 or 26' and the member 28 constitute a closure for the opening 20. The member 28 is of greater length than the combined length of the head 12 and body 14. The closed end 30 of the member 28 extends beyond the forward edge of the lower portion of surface 18 but not beyond the forward edge of the upper portion of surface 18. The ends of the member 28 are formed into hook receiving ring-like members 34 with the ends of member 28 secured at 36. Any suitable type of hook or hooks may be used, such as gang hook 38.

The member 28 has a closed line receiving end 30 and diverging arms extending from the closed end. Hooks 38 are adapted to be secured to the free ends of arms. The split ring is secured to the arms so that the arms aid in removing the split ring from the lure body.

The lure may be made of any suitable material and colored in any desired hue. It has proven very economical to make the lure of plastic material. When it is desired to use the lure below the water surface small shot or shots are placed in the weight receiving opening 20. The length of the arms of the member 28 from their points of attachment to the ends of the split ring 26 to the hook attaching portion must be great enough to permit grasping without contacting the hooks.

What is claimed is:

1. A fish lure comprising a plug like body having a circular shape in transverse cross section, a head of greater diameter than the body and forming a shoulder at the juncture of the body and head, said body having a weight receiving opening therein adjacent the head, an annular groove extending around the body and intersecting the weight receiving opening, a split ring of substantially the shape of the groove and receivable in the said groove and a member having a closed line receiving end and diverging arms with hook receiving ends, said arms being secured to the split ring to aid in removing the said ring, the said arms and split ring constituting a closure for the weight receiving opening.

2. A fish lure comprising a plug like body having an annular groove around the body adjacent one end, a split ring substantially the shape of said groove in the groove, a member having a closed line receiving end and arms diverging from the closed end, and hook receiving means at the end of said arms, said arms being secured to the split ring to aid in removing the ring from said groove, said member being longer than the plug body.

3. A fish lure comprising a plug having a body and a head and having a circular shape in transverse cross section, said head being of greater diameter than the body and having a substantially V-shaped face, said body having a groove there around adjacent the head, a split lock ring in said groove, and a member having a closed line receiving end and divergent arms extending from the closed end, said arms having free ends for receiving hooks, said arms being secured to the lock ring to aid in removing the ring from the plug body.

4. A fish lure comprising a plug body having a weight receiving opening therein, an annular groove extending around the body and intersecting the weight receiving opening, a split ring in said groove, a member having a closed line receiving end and divergent arms extending from the closed end, said arms having free hook receiving ends, said arms being secured to substantially the ends of the split ring, said ring and said arms constituting a closure for the weight receiving opening, said member being of greater length than the plug body, and hooks attached to the ends of the said arms.

References Cited in the file of this patent

UNITED STATES PATENTS

| | | |
|---|---|---|
| 1,079,891 | Simms | Nov. 25, 1913 |
| 2,415,742 | Hiltabidel et al. | Feb. 11, 1947 |
| 2,547,279 | Patterson | Apr. 3, 1951 |
| 2,686,381 | Peterson | Aug. 17, 1954 |
| 2,736,123 | Peterson | Feb. 28, 1956 |